Patented June 16, 1953

2,642,407

UNITED STATES PATENT OFFICE 2,642,407

ESTERIFIED AROMATIC HYDROCARBON PLASTICIZERS AND COMPOSITIONS CONTAINING SAME

Paul F. Bruins, Douglaston, N. Y., Edwin P. Wilkinson, Dallas, Tex., and Ernst P. Rittershausen, Hempstead, N. Y., assignors to Socony-Vacuum Oil Company, Incorporated, New York, N. Y., a corporation of New York No Drawing. Application July 8, 1949, Serial No. 103,736

7 Claims. (Cl. 260—31.8)

This invention has to do with a new and novel class of chemical compositions. More particularly, the present invention has to do with modified aromatic compositions and with resinous and plastic compositions containing them.

FIELD OF INVENTION

As is well known in the art, materials identified as "plasticizers" have long been added to resins or plastics—natural and synthetic—to soften and otherwise modify the properties thereof. Among the widely used plasticizers, three groups of materials are best known. The first comprises monomeric esters such as dioctyl phthalate (DOP) and tricresyl phosphate (TCP). These ester materials have proven of value in view of several advantageous characteristics and, yet, they have suffered from one or more disadvantages. For example, esters such as DOP and TCP are relatively expensive and, in addition, have been available in only limited quantities. One salient shortcoming is the relatively low resistance to gasolines and motor oils of vinyl resin compositions containing such plasticizers.

The second group of plasticizers consists of polymeric liquids or solids. The solid may be illustrated by the acrylonitrile-butadiene polymer. These plasticizers are characterized by greater compounding difficulties, low plasticizer efficiencies, good light stability and higher cost. They are used, however, because of their extremely low volatility and their non-migrating characteristics.

The third group of well-known plasticizing materials comprises aromatic hydrocarbons and aromatic fractions of petroleum or coal tar origin. This group of materials is generally characterized by lower plasticizer efficiency than the foregoing ester group, but possesses a considerable economic advantage in an appreciably lower cost. Aromatic hydrocarbon plasticizers have proven of value in a number of applications, particularly for vinyl resin and rubber formulations. For example, fractions predominating in alkylated polynuclear aromatics have been found to impart several outstanding characteristics to vinyl compositions, namely: non-migration into lacquer and paint films, capacity for heavy loading, high dielectric strength, wide compatability, good fluxing and milling. Unfortunately, however, aromatic hydrocarbon plasticizers have been at a disadvantage in that they are relatively unstable to ultra-violet light exposure. As can be readily appreciated, consumer resistance is encountered when a product darkens in color, during storage or use. This color deterioration is more pronounced in products with a high area to volume ratio, such as shower curtains, table covers, packaging and the like. The typical hydrocarbon odor of the aromatic plasticizers has also been responsible for some consumer resistance. The public has generally associated the odor of ester-type plasticizers with plastic or resinous materials, and has been reluctant to accept plastic or resinous materials having a typical aromatic hydrocarbon odor.

It has now been found that the foregoing shortcomings of the aforementioned types of plasticizers are overcome with the development of a new and novel class of compositions. The latter are characterized by improved plasticizer efficiency, color stability and odor. They are advantageous when used as the sole plasticizer in plastic or resinous compositions, and are also advantageous when used in such compositions in combination with ester-type and/or aromatic-hydrocarbon-type plasticizers.

The new chemical compositions contemplated herein are modified aromatic hydrocarbons which are obtained by: reacting, under conditions defined hereinbelow, an aromatic hydrocarbon fraction containing at least about seventy per cent of aromatics and having a boiling point of at least about 450° F. and less than about 800° F., with an unsaturated aliphatic anhydride or corresponding polycarboxylic acid to form an acidic condensation product, and reacting the latter reaction product with an alcohol having from about four to about twelve carbon atoms to form an esterified aromatic hydrocarbon.

NEW COMPOSITIONS

As indicated, the aromatic hydrocarbon fractions are defined by their aromatic content and boiling range. In addition, preferred fractions are those which contain at least about four per cent of unsaturated hydrocarbons or methyl-substituted hydrocarbons. It will be recognized that such fractions can be of petroleum or of coal tar origin. An excellent source of such materials is from catalytically cracked petroleum stocks. It will also be recognized that such fractions as these contain mono- and poly-alkyl naphthalenes, anthracenes, etc. Accordingly, an individual aromatic hydrocarbon of this character and having a boiling point within the indicated range, can also be used herein.

Typical, and preferred, aromatic hydrocarbon fractions are the following: an aromatic petroleum oil containing 95 per cent of aromatics and having a boiling range of 600–780° F.; and an aromatic petroleum oil containing 95 per cent of aromatics and having a boiling range of 500 to 640° F.

Unsaturated aliphatic anhydrides or their corresponding polycarboxylic acids are reacted with the aforesaid aromatic hydrocarbons, whereupon an acidic reaction product is obtained. Typical of such materials useful herein are: fumaric acid, maleic acid, itaconic acid, glutaconic acid, aconitic acid, and anhydrides thereof such as maleic anhydride. Particularly preferred herein, however, is maleic anhydride.

In reacting the aromatic hydrocarbons and unsaturated aliphatic anhydride (or acid), from about 0.25 to about one molar proportion of anhydride (or acid) is used for each molar proportion of aromatic hydrocarbon. Preferably, however, from about 0.20 to 0.35 molar proportion of anhydride (or acid) is used for each molar proportion of aromatic hydrocarbon. Reaction temperatures may be varied considerably, with temperatures from about 200° F. to 600° F. having proven to be satisfactory. Reaction times also permit wide variation but, to a large extent, are related to reaction temperatures. With temperatures within the foregoing range, reaction times of the order of 1.5 hours to 5.0 hours are advantageous. In this connection, it has been observed that somewhat longer reaction times are required when an acid, rather than an anhydride is used.

Reaction of the aromatic hydrocarbons and unsaturated aliphatic anhydride (or acid) is brought about with heat as indicated above, and with the aid of a catalytic agent. For example, well-known catalysts may be used, illustrative of which are aluminum chloride, hydrogen chloride and boron trifluoride. Temperatures may range from about 200° F. to about 250° F. Similarly, reaction times are generally shorter, as of the order of 1.5 to 3.0 hours.

As mentioned above, the acidic reaction product obtained by reaction of aromatic hydrocarbons and an anhydride (or acid) is reacted with an alcohol having from about four to about twelve carbon atoms per molecule to form the final product. The alcohol may be saturated or unsaturated, and substituted or unsubstituted in character. Representative alcohols include: butyl, amyl, hexyl, heptyl, octyl such as 2-ethylhexanol-1, decyl, dodecyl, methallyl, 2-methyl-3-pentene-2-ol, oleyl etc. In view of the outstanding characteristics of products obtained with alcohols having about eight carbon atoms, such alcohols are particularly preferred herein.

An amount of alcohol in excess of the stoichiometric amount as determined by the acid number of the adduct (aromatic hydrocarbon-anhydride reaction product) is employed so as to assure complete esterification of the acidic product.

Reaction temperatures used with the alcohol and acidic reaction product are also subject to considerable variation, depending to some degree upon the alcohol employed. Temperatures of the order of 150° F. to 220° F., with reaction times of two hours to four hours, have been found to provide satisfactory results. Typical esterification catalysts such as hydrochloric acid or various sulfonic acids are employed.

Typical, and non-limiting, examples of the foregoing new compositions are described in Examples I and II, below.

*Example I*

An electrically-heated reaction vessel equipped with a stirrer, condenser and inlet means, was charged with 944.5 parts by weight of an aromatic hydrocarbon fraction of the following character.

| | |
|---|---|
| Gravity, °A. P. I. | 2 |
| Visc. @ 100° F., SUV, secs. | 110 |
| Boiling range, °F. | 590–780 |
| Mixed aniline pt., °F. | 66 |
| (Aromatic content, per cent | 95) |

Maleic anhydride, 94.3 parts by weight, was slowly added, while stirring the aromatic fraction. After all maleic anhydride had been added, 9.45 parts by weight of aluminum chloride were added. The temperature of the reaction mixture was quickly raised to 100° F., by increasing the heat to the vessel, and was further raised, during a period of thirty minutes to 218° F., and maintained at the latter temperature for one and one-half hours. The reaction mixture was then cooled to 70° F. and filtered with a quantity, ten per cent by weight, of bleaching clay (Superfiltrol). The filtrate thus obtained was then water-washed to remove any unreacted maleic anhydride. The washed reaction product, 1014.2 parts by weight, was reacted with 2-ethyl-hexanol-1, 430 parts by weight, the latter being added slowly after six parts by weight of concentrated hydrochloric acid had been added to said reaction product. The resulting reaction mixture was heated at 170° F.±25° F. for a period of two hours. Then, the reaction mixture was cooled to 70° F. and water-washed to remove hydrochloric acid. The water-washed product was distilled at reduced pressure, 12 mms. Hg. A fraction, constituting 823 parts by weight and boiling within the range 600–760° F., at 760 mms., was obtained. This fraction, containing esterified aromatic hydrocarbons, represented a yield of 87 per cent, based upon the original aromatic hydrocarbon charge. The fraction or final product, hereinafter referred to as product A, has the following properties:

| | |
|---|---|
| Gravity, °A. P. I. | 4.1 |
| Visc. @ 100° F., SUV, secs. | 112 |
| Flash, C. O. C., °F. | 360 |
| Color, Lovibond | 33 |
| Saponification No. (Mgms. KOH/gm.) | 25.3 |

*Example II*

An electrically-heated reaction vessel equipped with a stirrer, condenser and inlet means was charged with 2000 parts, by weight, of an aromatic hydrocarbon fraction having the following characteristics:

| | |
|---|---|
| Gravity, °A. P. I. | 10.0 |
| Viscosity @ 100° F., SUV, secs. | 39.1 |
| Boiling range, °F. | 520–640 |
| Mixed aniline point, °F. | 57.3 |
| Aromatic content, per cent | 95 |

To this hydrocarbon fraction were added 400 parts, by weight, of maleic anhydride and thirty parts, by weight, of aluminum chloride. The resulting mixture was agitated for three hours and, during the agitation, the temperature was brought up to 240° F. in the first hour and so maintained for two hours. The reaction mixture was cooled to 70° F. and contacted with ten per cent, by weight, of activated clay and then filtered. The filtrate thus obtained was water-washed to remove unreacted maleic anhydride. To 1493 parts, by weight, of the washed filtrate (reaction product) were added 300 parts, by weight, of 2-ethyl-hexanol-1 and about fifteen parts, by weight, of concentrated hydrochloric acid. The resulting reaction mixture was then heated, while agitated, for three hours at 210–215° F. After this reaction period, the mixture was cooled to 70° F. and ten per cent, by weight of activated clay (Superfiltrol) was added. The clay was filtered off, and the filtrate so obtained was water-washed to remove any unreacted alcohol. The water-washed product was distilled at a pressure of 3 to 5 mms. of mercury. A fraction, in the boiling range of 600–750° F. at 760 mms. Hg, representing 58.6 of the charge was distilled off. This fraction, containing esterified hydrocarbons, represented a yield of 37 per cent of the original aromatic hydrocarbon charge. The final product, hereinafter referred to as product B, has the following properties:

Gravity, °A. P. I _____ 9.5
Saponification No _____ 39.3
  (Mgms. KOH/gm.)

RESINS AND PLASTICS

Resins and plastics are well known in the art and are described at length in such standard texts as "Synthetic Resins and Rubbers," Paul A. Powers, 1943.

Inasmuch as the esterified aromatic hydrocarbons described hereinabove are excellent plasticizers for vinyl resins or polymers, the following illustrations of vinyl compositions are provided. It is to be understood, however, that other resinous and plastic materials may be used with these new compositions. Typical vinyl resins or polymers are described in part III of the above-mentioned text, and include: acetate, chloracetate, alcohol, alcohol acetal, ethers, ketones, bromide, chloride, vinylidene chloride, acrylates and methacrylates, styrene; and mixtures thereof such as vinyl chloride-vinyl acetate and vinyl chloride-vinylidene chloride.

Particularly advantageous compositions have been formed with copolymers of vinyl chloride and vinyl acetate containing from 90–98% vinyl chloride and 2–10% vinyl acetate, with an intrinsic viscosity range of 0.55 to 1.55 for a 0.4% solution of the resins in cyclohexane. The term "intrinsic viscosity" used herein is defined at pages 47–49 of the above-mentioned text.

It will be understood that the vinyl resins used in association with the foregoing esterified aromatic hydrocarbons, may vary considerably in molecular weight and in physical characteristics. In general, however, most satisfactory results are obtained with those having a viscosity range, which is an indication of molecular weight, from about 0.55 to 1.55.

A. *Compounding of vinyl resin and plasticizer*

Quantities of vinyl resin, esterified aromatic hydrocarbon (alone or with another plasticizer) and a stabilizer, described below, are combined in a suitable vessel and thoroughly mixed, in the conventional manner. It is desirable to have the resin completely wetted by the plasticizer. The mixture thus obtained is milled, for example, on a standard 12 x 6 laboratory rubber mill, with the rolls thereof maintained at approximately 290° F. The resin-plasticizer mixture fluxes at about 270° F., forming a continuous band of vinyl sheet around one roll. The clearance between the two rolls is set at such a distance that the excess resin mix forms a "bank" between the two rolls. In this manner, the batch is well mixed. After complete mixing, the batch is cut from the roll in the form of a thin sheet.

For test purposes, sufficient plies or layers of the vinyl sheet are placed in a standard A. S. T. M. 6" x 6" x 0.32" mold, and formed into sheets of those dimensions by heat and pressure. After cooling and removal of the molded sheet, standard A. S. T. M. "dumbbells" and other necessary test strips are stamped out in a die.

With regard to the proportions of vinyl resin and esterified aromatic hydrocarbons, it has been found that these materials are compatible over a wide range. Advantageous proportions of the esterified aromatic hydrocarbons and vinyl resin will vary considerably depending upon the application for which the product is formulated.

As indicated above, the esterified aromatic hydrocarbons have proven of excellent value when used with plasticizers hitherto and presently used with vinyl resins. Typical plasticizers with which the new compositions may be associated are tricresyl phosphate, dioctyl phthalate, dibutyl sebacate and aromatic petroleum oils. Excellent results have been obtained by using from about 10 to about 90 parts by weight of new composition, with from about 90 to about 10 parts by weight of a conventional vinyl plasticizer, per 100 parts by weight of a vinyl resin.

Previously mentioned in connection with compounding of a vinyl resin and a plasticizer was the use of a stabilizer. The latter are generally used with vinyl resin compositions in small proportions, of the order of one to five per cent by weight, of vinyl resin. Stabilizers which may be used to advantage with the resin compositions of this invention include dibasic lead stearate, basic lead carbonate, tin soaps, alkaline earth metal soaps, metallic oxides, and aromatic amines.

B. *Examples*

To demonstrate the character of vinyl resin compositions plasticized with the esterified aromatic hydrocarbons, various test samples were subjected to standard A. S. T. M. test methods. Results of these tests are shown below in the table. For the determination of plasticizer efficiency, tensile strength and per cent elongation, a standard A. S. T. M. type B specimen dumbbell was used. The tests were made on a Scott tensile tester under the conditions prescribed by A. S. T. M. Method D412-41.

Plasticizer efficiency is a measure of the degree of softening obtained by the plasticizer under test when used at a given concentration. It is determined by measuring the stress needed to elongate a sample specimen twice its original length.

Flexure strength is determined on a Tinius Olsen flexure strength apparatus, in which the force required to bend a test specimen through a 90 degree angle is measured.

The light stability test is made with the Fade-O-Meter, which is a widely used test apparatus for exposure to intense ultraviolet light under controlled conditions.

In the tabulation of test results shown below in the table, the following symbols are used to identify the individual vinyl resins, esterified aromatic hydrocarbons, and conventional plasticizers (in each resin composition under test, 1% by weight of dibasic lead stearate was present as a stabilizer):

Plasticizer A: Product A above (Example I).
Plasticizer B: Product B above (Example II).
Plasticizer C: Aromatic oil, 600–780° F. boiling range, 2° A. P. I. gravity, and 110 secs. SUV @ 100° F.
Plasticizer D: Plasticizer C containing 3% of dioctyl maleate.
Vinyl F: Vinyl chloride-vinyl acetate copolymer, containing 90–98% vinyl chloride and 2–10% vinyl acetate, with an intrinsic viscosity range of about 0.55 to 1.55.

TABLE

|  | A | B | C | D |
|---|---|---|---|---|
| Composition: |  |  |  |  |
| Plasticizer, wt. percent | 40 | 40 | 40 | 40. |
| Resin, wt. percent, Vinyl F | 60 | 60 | 60 | 60. |
| Stress @ 100% | 1,430 |  |  | 1,510. |
| Tensile Strength, p. s. i | 2,900 |  | 2,690 | 2,890. |
| Elongation @ break, percent | 280 |  | 200 | 250. |
| Stiffness in Flexure, p. s. i | 796 |  | 1,368 |  |
| Light Stability (Fade-O-Meter @ 126° F.): |  |  |  |  |
| 0.5 hr | OK | OK | V. Sl. off | OK. |
| 1.0 hr | V. Sl. off | OK | Off | V. Sl. off. |
| 1.5 hrs | Sl. off | V. Sl. off |  | Off. |
| 2.0 hrs | Off | Sl. off |  |  |
| 2.5 hrs |  | Off |  |  |
| 4.0 hrs |  |  |  |  |
| Shelf Storage Life | 600 days |  | 21 days | 21 days. |

From the test results set forth in the table, it will be noted that compositions containing esterified aromatic hydrocarbons as plasticizers have excellent properties. For example, the elongation at the point of rupture was 40 per cent greater in the case of the esterified aromatic hydrocarbons (plasticizer A), as compared with the aromatic oil (plasticizer C). In addition, the same composition was mechanically stronger, as shown by the tensile strength value at the point of rupture, 2900 p. s. i. as compared with 2690 p. s. i. Plasticizer efficiency was also substantially better: 1430 versus 1810; so also was flexure strength: 796 versus 1368. A noticeable improvement in light stability is shown by the extension from 0.5 hour to 1.5 hours. Shelf life storage is remarkably different for these resin compositions, 600 days as compared with 21 days or an improvement of approximately 2760 per cent. Moreover, the vinyl sheet with product A had very little, if any, odor.

It is to be understood that the foregoing typical examples serve to illustrate the invention and not to limit the same; rather, the invention is to be broadly construed with the language of the appended claims.

We claim:

1. A composition of matter comprising a vinyl resin and esterified aromatic hydrocarbons obtained by: reacting, at a temperature between about 200° F. and about 250° F. and in the presence of a Friedel-Crafts catalyst, one molar proportion of an aromatic hydrocarbon fraction containing at least about seventy per cent of aromatic hydrocarbons and having a boiling point of at least about 450° F. and less than about 800° F., with from about 0.20 to about one molar proportion of maleic anhydride to form an acidic reaction product, and reacting, at a temperature between about 150° F. and about 220° F., said acidic reaction product with 2-ethyl-hexanol-1 to form said esterified aromatic hydrocarbons.

2. A composition of matter as defined by claim 1 comprising from about 10 to about 90 parts by weight of a vinyl resin and from about 90 to about 10 parts by weight of esterified aromatic hydrocarbons.

3. A composition of matter comprising a vinyl resin composition containing 60 parts by weight of a vinyl resin comprising a vinyl chloride-vinyl acetate copolymer, and about 40 parts by weight of esterified aromatic hydrocarbons obtained by: reacting, at a temperature of about 220° F. and in the presence of aluminum chloride, one molar proportion of an aromatic hydrocarbon fraction containing about 95 per cent of aromatic hydrocarbons and having a boiling range from about 590° F. to about 780° F., with from about 0.20 to 0.35 molar proportion of maleic anhydride to form an acidic reaction product, and reacting, at a temperature of about 170° F., said acidic reaction product with 2-ethyl-hexanol-1 to form said esterified aromatic hydrocarbons.

4. A composition of matter comprising a vinyl resin composition containing 60 parts by weight of a vinyl resin comprising a vinyl-chloride-vinyl acetate copolymer, and about 40 parts by weight of esterified aromatic hydrocarbons obtained by: reacting, at a temperature of about 240° F. and in the presence of aluminum chloride, one molar proportion of an aromatic hydrocarbon fraction containing about 95 per cent of aromatic hydrocarbons and having a boiling range from about 520° F. to about 640° F., with from about 0.20 to 0.35 molar proportion of maleic anhydride to form an acidic reaction product, and reacting, at a temperature of about 210° F., said acidic reaction product with 2-ethyl-hexanol-1 to form said esterified aromatic hydrocarbons.

5. A composition as defined by claim 1 wherein the aromatic hydrocarbon fraction has a boiling range from about 590° F. to about 780° F. and an aromatic hydrocarbon content of about 95 per cent.

6. A composition as defined by claim 1 wherein the aromatic hydrocarbon fraction has a boiling range from about 520° F. to about 640° F. and an aromatic content of about 95 per cent.

7. A composition as defined by claim 1 wherein the vinyl resin is a vinyl chloride-vinyl acetate copolymer, containing 90–98 per cent vinyl chloride and 2–10 per cent vinyl acetate, with an intrinsic viscosity range of about 0.55 to 1.55.

PAUL F. BRUINS.
EDWIN P. WILKINSON.
ERNST P. RITTERSHAUSEN.

References Cited in the file of this patent

UNITED STATES PATENTS

| Number | Name | Date |
|---|---|---|
| 1,972,579 | Wickert | Sept. 4, 1934 |
| 1,984,283 | Reid | Dec. 11, 1934 |
| 2,099,120 | Kirby | Nov. 16, 1937 |
| 2,325,921 | Gresham | Aug. 3, 1943 |
| 2,387,111 | Bent | Oct. 16, 1945 |
| 2,511,577 | Geiger | June 13, 1950 |